(12) United States Patent
Waters et al.

(10) Patent No.: US 10,498,167 B2
(45) Date of Patent: Dec. 3, 2019

(54) MULTI-PORT POWER DELIVERY

(71) Applicant: TEXAS INSTRUMENTS INCORPORATED, Dallas, TX (US)

(72) Inventors: Deric Wayne Waters, Dallas, TX (US); Robert Mason Hanrahan, Montvale, NJ (US)

(73) Assignee: Texas Instruments Incorporated, Dallas, TX (US)

( * ) Notice: Subject to any disclaimer, the term of this patent is extended or adjusted under 35 U.S.C. 154(b) by 240 days.

(21) Appl. No.: 15/617,761

(22) Filed: Jun. 8, 2017

(65) Prior Publication Data
US 2017/0358947 A1 Dec. 14, 2017

Related U.S. Application Data

(60) Provisional application No. 62/347,493, filed on Jun. 8, 2016.

(51) Int. Cl.
*H02J 13/00* (2006.01)
*G05B 15/02* (2006.01)
*H02J 1/00* (2006.01)
*H02J 7/00* (2006.01)

(52) U.S. Cl.
CPC .......... *H02J 13/0003* (2013.01); *G05B 15/02* (2013.01); *H02J 1/00* (2013.01); *H02J 7/0052* (2013.01); *H02J 2001/008* (2013.01); *H02J 2007/0062* (2013.01)

(58) Field of Classification Search
CPC .... H02J 1/00; H02J 7/0052; H02J 2007/0062; H02J 13/0003; H02J 2001/008; G05B 15/02
See application file for complete search history.

(56) References Cited

U.S. PATENT DOCUMENTS

| 5,884,086 | A | 3/1999 | Amoni et al. |
| 6,091,617 | A | 7/2000 | Moran |
| 6,459,175 | B1* | 10/2002 | Potega .................. G01R 31/36 307/149 |

(Continued)

FOREIGN PATENT DOCUMENTS

WO 2015119623 A2 8/2015

OTHER PUBLICATIONS

Office Action for U.S. Appl. No. 15/205,806, dated Jan. 12, 2018 (7 pages).

(Continued)

*Primary Examiner* — Jared Fureman
*Assistant Examiner* — Duc M Pham
(74) *Attorney, Agent, or Firm* — Tuenlap Chan; Charles A. Brill; Frank D. Cimino

(57) ABSTRACT

A power provider circuit includes a plurality of power delivery controllers, a single stage power supply, and control circuitry. Each of the plurality of power delivery controllers is configured to provide power to a detachable device. The single stage power supply is configured to generate the power for provision to the detachable devices, and to provide the power at a plurality of selectable voltages. The control circuitry configured to select a given voltage of the plurality of selectable voltages to be made available via all of the power delivery controllers based on power utilization capabilities and other optional status indications reported by the detachable devices.

20 Claims, 4 Drawing Sheets

(56) References Cited

U.S. PATENT DOCUMENTS

| | | |
|---|---|---|
| 6,952,748 B1 | 10/2005 | Guerrero, Jr. et al. |
| 2005/0197094 A1 | 9/2005 | Darshan et al. |
| 2006/0164062 A1 | 7/2006 | Stineman, Jr. et al. |
| 2010/0127568 A1* | 5/2010 | Ng .............................. H02J 1/14 |
| | | 307/32 |
| 2012/0131357 A1 | 5/2012 | Karam et al. |
| 2013/0290765 A1 | 10/2013 | Waters et al. |
| 2014/0117970 A1 | 5/2014 | Kitagaki |
| 2014/0136863 A1 | 5/2014 | Fritchman et al. |
| 2014/0208134 A1* | 7/2014 | Waters .................. G06F 13/385 |
| | | 713/310 |
| 2014/0320075 A1 | 10/2014 | Baurle |
| 2016/0043586 A1 | 2/2016 | Wang et al. |
| 2016/0163480 A1 | 6/2016 | Lester |
| 2017/0031403 A1 | 2/2017 | Waters |
| 2017/0115711 A1* | 4/2017 | Jaramillo ................ G06F 1/266 |

OTHER PUBLICATIONS

U.S. Appl. No. 15/392,047, filed Dec. 28, 2016 (29 pages).
Search Report for PCT Application No. PCT/US16/44883, dated Nov. 3, 2016 (1 page).
Search Report for PCT Application No. PCT/US2017/068650, dated May 4, 2018 (1 page).

* cited by examiner

MULTI-PORT POWER DELIVERY

CROSS-REFERENCE TO RELATED APPLICATIONS

The present application claims priority to U.S. Provisional Patent Application No. 62/347,493, filed Jun. 8, 2016, entitled "Single Stage Multi-Port USB Power Delivery Provider with Cooperative Voltage Selection," which is hereby incorporated herein by reference in its entirety for all purposes.

BACKGROUND

Over time, various data communication technologies have evolved to include power transfer capabilities. For example, universal serial bus (USB) power delivery (PD) can provide substantial power for operating and/or charging a computing device. USB-PD is intended to provide a universal power source for computing devices that may require higher power (e.g., higher voltage) than is provided via legacy USB. USB-PD provides a communication link between ports connected via a USB-PD cable and connectors defined by standards. The communication is half-duplex and packet-based. The packets contain information that enables the two ports to communicate and negotiate the voltage and current the source port will provide to the sink port.

SUMMARY

A power delivery system and method that cooperatively selects the voltage to be provided to multiple ports from a single power source are disclosed herein. In one embodiments, a power provider circuit includes a plurality of power delivery controllers, a single stage power supply, and control circuitry. Each of the plurality of power delivery controllers is configured to provide power to a detachable device. The single stage power supply is configured to generate the power for provision to the detachable devices, and to provide the power at a plurality of selectable voltages. The control circuitry is configured to select a given voltage of the plurality of selectable voltages to be made available via all of the power delivery controllers based on power utilization capabilities reported by the detachable devices.

In some embodiments of a method for power delivery, if a single detachable device is connected to the power delivery controllers, based on the power utilization capabilities of the single detachable device, a given voltage is provided to the single detachable device. If an additional detachable device is connected to the power delivery controllers, then, to accommodate the single stage power supply, all of the detachable devices are provided only a predetermined voltage (e.g., 5 volts) that is lower than the voltage provided to the single detachable device.

In another embodiment, a method for power delivery includes attaching a first detachable device to a first power delivery controller, and attaching a second detachable device to a second power delivery controller. The first power delivery controller retrieves, from the first detachable device, power utilization capabilities of the first detachable device. The second power delivery controller retrieves, from the second detachable device, power utilization capabilities of the second detachable device. One of a plurality of voltages to generate as an output voltage of a single stage power supply is selected to be made available to the first detachable device and the second detachable device based on the power utilization capabilities of the first detachable device and the power utilization capabilities of the second detachable device.

In a further embodiment, a power provision system includes a plurality of power delivery controllers, a single stage power supply, and control circuitry. Each of the power delivery controllers is configured to provide power to a detachable device. The single stage power supply is configured to generate the power for provision to the detachable devices, and to provide the power at a plurality of selectable voltages. The control circuitry is configured to determine whether multiple detachable devices are connected to the power delivery controllers. The control circuitry is also configured to, responsive to a determination that a single detachable device is connected to the power delivery controllers, cause a given one of the power delivery controllers to notify the single detachable device of availability of all of the selectable voltages. The control circuitry is further configured to, responsive to a determination that multiple detachable devices are connected to the power delivery controllers, cause the power delivery controllers to notify the multiple detachable devices of availability of no more than two of the selectable voltages.

Implementations of the systems disclosed herein employ logic and circuitry of various forms to determine the most appropriate common voltage (i.e., voltage to be provided to all detachable devices). A common voltage selection can be based on the power utilization capabilities and status of the detachable devices as well as any other possible stimulus available to the selection logic, temperature or time being examples. The embodiments of the present disclosure advantageously provide one or more of smaller size, less complex design, and/or lower cost than conventional power delivery systems.

BRIEF DESCRIPTION OF THE DRAWINGS

For a detailed description of various examples, reference will now be made to the accompanying drawings in which.

DETAILED DESCRIPTION

Figure 1:
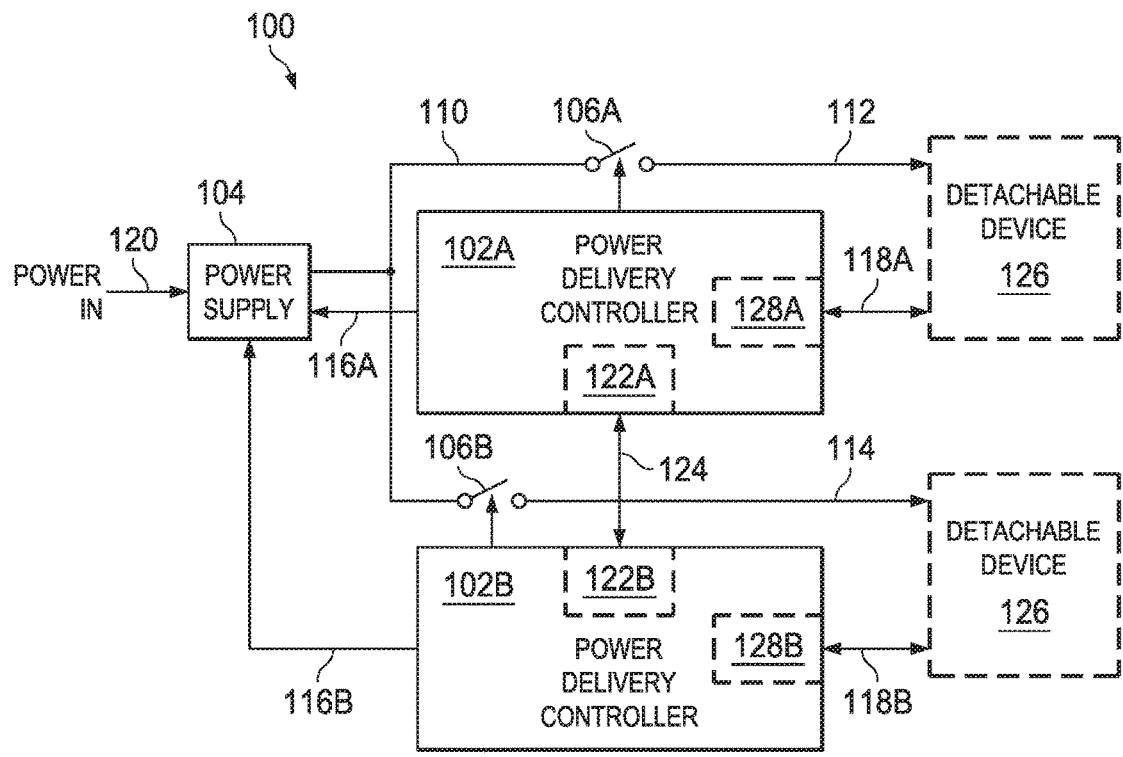
FIG. 1 shows a block diagram of a power provision system with distributed control circuitry in accordance with various embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising"

are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

In a conventional universal serial bus (USB) power delivery (PD) system, a power source advertises its power provision capabilities via power data objects (PDOs) that are included in a message called a Source Capabilities message. Fixed-Supply PDOs contain a voltage and maximum current; Variable-Supply PDOs contain maximum voltage, minimum voltage, and maximum current; Battery-Supply PDOs contain maximum voltage, minimum voltage, and maximum power. A power source may advertise up to seven unique PDOs at once. A power sink (i.e., a load device) may request one of the advertised PDOs at a certain current or power via a message called a Request message. If the power source can meet the sink's request it sends, to the power sink, a message called an Accept message, otherwise the power source may send a Reject or Wait message. After the power source has adjusted its power supply, it sends a message called PS_RDY to inform the power sink that it can begin sinking the power per its request.

Analogous to Source Capabilities of a power source, power sinks have what are called Sink Capabilities, which include up to seven PDOs. Each power sink PDO specifies a power utilization capability of the power sink as including: supply type, max voltage, min voltage, and operational current. To satisfy a power sink PDO, a power source PDO must provide maximum and minimum voltages that are within the maximum and minimum voltage range of the power sink PDO, and the maximum current of the power source PDO must be greater than or equal to the operational current of the power sink PDO. The supply types indicated in the power sink and power source PDO preferably also match. If the supply type is battery, then the source and sink specify power rather than current.

A power source is triggered to advertise its power provision capabilities by detection of a power sink connection. For example, connection of a power sink may pull down a voltage provided by the power source. The power source monitors the voltage and identifies reduction of the voltage within a predetermined range as indicating connection of a power sink.

Prior to advertising its power provision capabilities, a power source control device determines what voltages the power source is capable of producing. Such information may be provided to the control device via programmed constants or data provided from a source external to the control device. The control device may set a power supply output voltage to be provided to a power sink in accordance with voltages the power source is capable of producing and results of negotiation with the power sink.

Multi-port systems include multiple ports, where each port supports connection of a power sink. A conventional multi-power architecture includes a multi-stage converter. For example, a first stage may include an AC-DC converter that produces one or more DC outputs from the AC provided by the power mains, and a second stage may include one or more DC-DC converters that generate a DC output from the DC generated by the first stage converter. A different DC-DC converter may be dedicated to each port or multiple outputs may be employed within the AC-DC stage. Such an architecture allows each port to adapt its voltage independently from the other port at the expense of increased cost and circuit area. However, because each of the multiple stages is typically 90% to 95% efficient at best, multi-stage architectures may be substantially less efficient than single-stage architectures while also requiring greater circuit area. In addition, a multi-output AC-DC stage requires greater circuit area and complexity resulting in higher cost. Accordingly, use of a single-stage with a single selectable output voltage architecture can provide a significant improvement in overall efficiency and circuit size, thereby allowing higher power delivery in applications where acceptable heat dissipation is limited.

Embodiments of the power delivery system disclosed herein provide reduced cost and circuit size relative to conventional multi-port solutions. Embodiments of the present disclosure include a multi-port power provider circuit with a single power stage. The system includes control circuitry that ensures that different voltages are not provided to devices concurrently connected to the provider circuit by cooperatively selecting the voltage to be provided to the devices. Embodiments may provide any available voltage (e.g., voltages greater than 5 volts) to multiple ports in accordance with the cross-port cooperative selection while maintaining compliance with the USB power delivery standard. While various embodiments disclosed herein are compatible with the USB standards, the power delivery system is not limited to USB applications.

FIG. 1 shows a block diagram of a power provision system 100 with distributed control circuitry in accordance with various embodiments. The system 100 is a power provider circuit that includes power delivery controllers 102A and 102B (each also referred to herein as a power delivery controller 102), a power supply 104, and power switches 106A and 106B. Each of the power delivery controllers 102 serves as a port that manages delivery of power generated by the power supply 104 to a device that is detachably coupled to the power delivery controller 102 via a connector (not shown). Such a device may also be referred to as a power sink or a detachable device. While the system 100 is illustrated as including only two power delivery controllers 102, some embodiments may include more than two power delivery controllers 102. In various embodiments, the power delivery controllers 102 may be integrated on a single device, or provided as separate devices. A detachable device 126 is illustrated as connected to each of the power delivery controllers 102 in FIG. 1. While the detachable devices 126 are not part of the power provision system 100, the detachable devices 126 are included in FIG. 1 to facilitate explanation of the operation of the system 100.

The power supply 104 is coupled to the power delivery controllers 102, and generates the power provided to the detachable devices 126 coupled to the power delivery controllers 102. The power supply 104 is a single stage power supply. For example, the power supply 104 may include a single AC-DC converter that generates a DC output voltage from AC power provided by the power mains. In some embodiments, the power supply 104 lacks an AC-DC converter, but includes a single DC-DC converter that generates a DC output voltage from DC power provided by a battery or other DC power source. The output 110 of the power supply 104 is coupled to the power switches 106A and 106B (also referred to as a power switch 106). Each of the power switches 106 is coupled to and controlled by one of the power delivery controllers 102. The power delivery controller 102 may close the switch 106 to provide power via signal 112 or 114 to a detachable device 126 coupled to the power delivery controller 102, and open the switch 106 to isolate the detachable device 126 from the power supply 104.

The power supply 104 can generate a variety of voltages. For example, power supply 104 may controllably generate the DC output 110 to be 5 volts, 9 volts, 15 volts, 20 volts, or a variety of other voltages. The power delivery controllers 102 produce output signals 116A and 116B (also referred to as output signals 116) that control the voltage of the power supply output 110. The output signals 116 may include a serial bus (e.g., I²C, SMB, etc.) that communicates with power supply 104, wire or'd signals (signals 116A and 116B wire or'd) that allow cooperatively control the power supply 104, or any other signals that allow the power delivery controllers 102 to change the output voltage of the power supply 104. Thus, each of the power delivery controllers 102 is coupled to and controls the power supply 104. The power delivery controllers 102 may control the output voltage of the power supply 104 by changing a feedback voltage provided to a controller of the power supply 104. The feedback voltage may be derived from the output 110. The power delivery controllers 102 are aware of the various voltages and associated currents/powers that the power supply 104 can generate. For example, the various voltage/current/power combinations provided by the power supply 104 may be hard-coded into the power delivery controllers 102, provided to the power delivery controllers 102 at runtime via an external device, etc.

The power delivery controllers 102 include control circuitry that manages the selection of voltage provided by the power supply 104 on output 110. The control circuitry is illustrated as circuitry 122A in power delivery controller 102A and as circuitry 122B in power delivery controller 102B. The control circuitry 122A and 122B is also referred to herein as control circuitry 122. The control circuitry 122 in the power delivery controllers 102 cooperatively determines which of the voltages that the power supply 104 is capable of generating are to be made available to the detachable devices 126 coupled to the power delivery controllers 102. The control circuitry 112 may consider the power provision capabilities of the power supply 104, the power utilization capabilities of the detachable devices 126, and other system level status, such as temperature measurements, in determining which of the voltages that the power supply 104 is capable of generating are to be made available to the detachable devices 126 coupled to the power delivery controllers 102. The control circuitry 122 may include a processor, state, machine, or other circuitry to manage selection of the voltages to be advertised to the detachable devices 126 and to initiate query of the detachable devices 126, advertisement to the detachable devices 126, etc.

To determine which voltages of the power supply 104 are to be made available to the detachable devices 126, the power delivery controllers 102 can communicate with the detachable devices 126 via signals 118A and 118B (also referred to as signal 118). The power delivery controllers 102 include sink communication circuitry 128A and 128B (also referred to herein as sink communication circuitry 128) for communicating with the detachable devices 126 via the signals 118. The sink communication circuitry 128 detects attachment of the detachable device 126 to the power delivery controller 102 and detects detachment of the detachable device 126 from the power delivery controller 102. For example, a change in voltage of one of the signal 118 that is not caused by the power delivery controller 102 may indicate attachment or detachment of a detachable device 126. The sink communication circuitry 128 may include transceivers, codecs, and other circuitry to enable communication between the power delivery controller 102 and a detachable device 126.

The power delivery controller 102 can also exchange messages with the detachable device 126 via the signals 118. More specifically, the power delivery controller 102 can transmit a message to the detachable device 126 requesting that the detachable device 126 provide information with regard to the power utilization capabilities of the detachable device 126. The power utilization capabilities of the detachable device 126 may include multiple values of voltage and current at which the detachable device 126 can operate. Responsive to reception of the request for power utilization capability information, a detachable device 126 transmits the requested power utilization information to the requesting power delivery controller 102. When multiple detachable devices 126 are coupled to the system 100, each of the power delivery controllers 102 requests that the connected detachable device 126 provide power utilization information.

The power delivery controllers 102 share the power utilization information provided by the detachable devices 126 via the communication signals 124. The communication signals 124 may include a serial bus (e.g., I²C, SMB, etc.), dedicated flag signals, or any other signals that allow the power delivery controllers 102 to exchange information. Given the power utilization information of all of the detachable devices 126, as well as any other optional status information (such as temperature or time of day), the power delivery controllers 102 cooperatively determine which voltages to advertise or make available to the detachable devices 126. For example, given the power utilization capabilities of all of the detachable devices 126, the power delivery controllers 102 (e.g., the control circuitry 122) may cooperatively determine that a highest voltage that can be generated by the power supply 104 and that can be utilized by all of the detachable devices 126 will be advertised to the detachable devices 126. Given determination of a cooperatively selected voltage, some embodiments of the power delivery controller 102 may transmit a message to the detachable device 126 notifying the detachable device 126 of one or more voltages (and associated current or power) available for use by the detachable device 126. For example, the power delivery controller 102 may notify the detachable device 126 that the cooperatively selected voltage and a predetermined voltage (e.g., 5 volts) are available for use by the detachable device 126. The predetermined voltage will generally be a voltage useable by all detachable devices 126.

Responsive to notification of the available voltages, each detachable device 126 may request that one of the available voltages be provided to the detachable device 126. Each detachable device 126 will generally request the cooperatively selected voltage because the cooperatively selected voltage will be higher than, and consequently provide greater operational capability, than the predetermined voltage. Should the detachable devices 126 not all select the same advertised available voltage, then the power delivery controllers 102 may reinitiate selection of available voltages and advertise only the predetermined voltage to the detachable devices 126. On selection of a same one of the available voltages by the detachable devices 126, the power delivery controllers 102 may communicate with the power supply 104, via output signals 116, to cause the power supply 104 to generate the selected output voltage. At any point in time optional status may change resulting in a change of voltage selection. In one example, a system temperature exceeding a limit requires a reduction to a lower common voltage.

Figure 2:
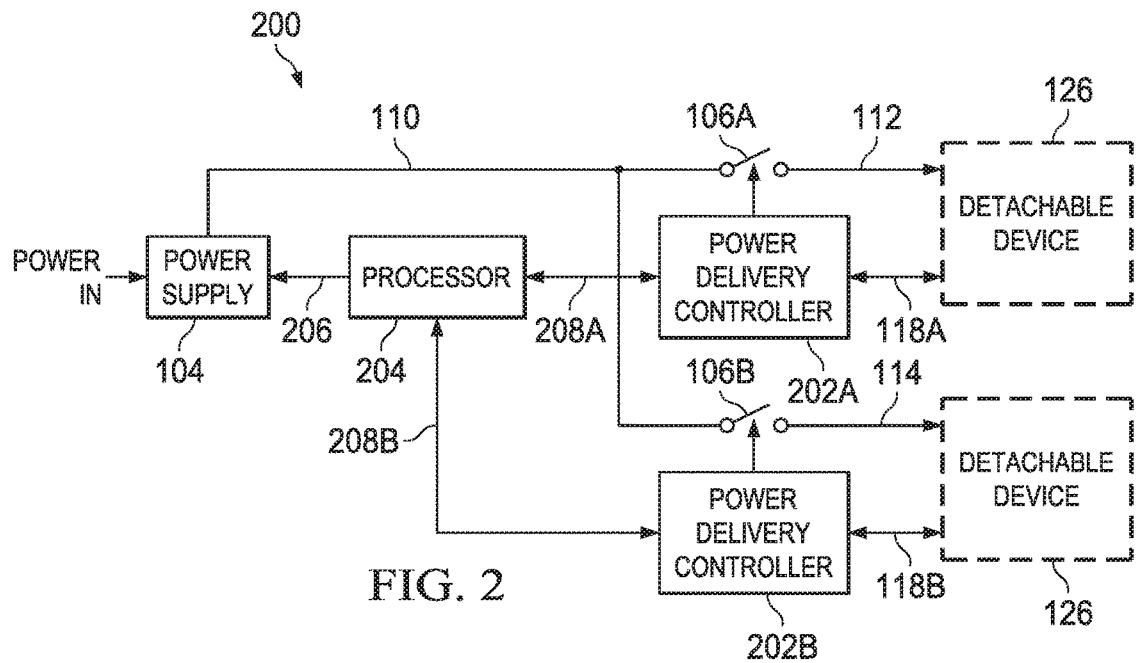
FIG. 2 shows a block diagram of a power provision system with centralized control circuitry in accordance with various embodiments.

FIG. 2 shows a block diagram of a power provision system 200 with centralized control circuitry in accordance with various embodiments. The system 200 includes power delivery controllers 202A and 202B (each also referred to herein as a power delivery controller 202), a power supply 104, power switches 106A and 106B, and processor 204. To facilitate explanation, a detachable device 126 is illustrated as connected to each of the power delivery controllers 202 in FIG. 2. Each of the power delivery controllers 202 manages delivery of power generated by the power supply 104 to a detachable device 126 that is coupled to the power delivery controller 202. While the system 200 is illustrated as including only two power delivery controllers 202, some embodiments may include more than two power delivery controllers 202. In various embodiments, the power delivery controllers 102 and the processor 204 may be integrated on a single device, or provided as separate devices.

The power supply 104 is coupled to the power delivery controllers 202, and generates the power provided to the detachable devices 126 coupled to the power delivery controllers 202. The power supply 104 is a single stage power supply. For example, the power supply 104 may include a single AC-DC converter that at a given time generates a single DC output voltage from AC power provided by the power mains. In some embodiments, the power supply 104 lacks an AC-DC converter, but includes a single DC-DC converter that generates a DC output voltage from DC power provided by a battery or other DC power source. The output 110 of the power supply 104 is coupled to the power switches 106. Each of the power switches 106 is coupled to and controlled by one of the power delivery controllers 202. The power delivery controller 202 may close the switch 106 to provide power to a detachable device 126 coupled to the power delivery controller 202, and open the switch 106 to isolate the detachable device 126 from the power supply 104.

The power supply 104 can generate a variety of voltages. For example, power supply 104 may controllably generate the DC output 110 to be 5 volts, 9 volts, 15 volts, 20 volts, or a variety of other voltages. The power supply 104 is coupled to the processor 204. The processor 204 may be a microcontroller, a general-purpose microprocessor, or other device that executes instructions to provide control functionality in the system 200. Instructions executed by the processor 204 may be stored in a computer-readable medium, such as a memory device, accessible by the processor 204.

Via output signals 206, the processor 204 selects the voltage provided by the power supply 104 on output 110. The signals 206 may include a serial bus (e.g., I²C, SMB, etc.), dedicated flag signals, or any other signals that allow the processor 204 to control the output voltage of the power supply 104. The processor 204 may control the output voltage of the power supply 104 by changing a feedback voltage provided to a controller of the power supply 104. The feedback voltage may be derived from the output 110.

The processor 204 manages the selection of voltages advertised to the detachable devices 126 and provided by the power supply 104 on output 110. Thus, in the system 200, the processor 204 serves as and provides the functionality of the control circuitry 122 of the system 100. The processor 204 determines which of the voltages that the power supply 104 is capable of generating are to be made available to the detachable devices 126 coupled to the power delivery controllers 202.

To determine which voltages of the power supply 104 are to be made available to the detachable devices 126, the power delivery controllers 202 can communicate with the detachable devices 126 via signals 118. The power delivery controllers 202 include sink communication circuitry 128 for communicating with the detachable devices 126 via the signals 118. The sink communication circuitry 128 detects attachment of the detachable device 126 to the power delivery controller 202 and detects detachment of the detachable device 126 from the power delivery controller 202. For example, a change in voltage on one of the signals 118 that is not caused by the power delivery controller 202 may indicate attachment or detachment of a detachable device 126.

The power delivery controller 202 can also exchange messages with the detachable device 126 via the signals 118. More specifically, the power delivery controller 202 can transmit a message to the detachable device 126 requesting that the detachable device 126 provide information with regard to the power utilization capabilities of the detachable device 126. The power utilization capabilities of the detachable device 126 may include values of voltage and current at which the detachable device 126 can operate. Responsive to reception of the request for power utilization capability information, a detachable device 126 transmits the requested power utilization information to the requesting power delivery controller 202. When multiple detachable devices 126 are coupled to the system 200, each of the power delivery controllers 202 requests that the connected detachable device 126 provide power utilization information.

The power delivery controllers 202 provide the power utilization information received from the detachable devices 126 to the processor 204 via the communication signals 208A and 208B (also referred to as communication signals 208). The communication signals 208 may include a serial bus (e.g., I²C, SMB, etc.), dedicated flag signals, or any other signals that allow the processor 204 and the power delivery controllers 102 to exchange information. Given the power utilization information of all of the detachable devices 126, the processor 204 determines which voltages to advertise or make available to the detachable devices 126. For example, given the power utilization capabilities of all of the detachable devices 126, the processor 204 may determine that a highest voltage that can be generated by the power supply 104 and that can be utilized by all of the detachable devices 126 will be advertised to the detachable devices 126.

In some embodiments, the processor 204 may consider various additional parameters of the system 200 to select voltages to advertise. For example, the processor 204 may consider

- maximum and/or minimum voltage useable by the detachable device 126;
- minimum current or power useable by the detachable device 126;
- charge state of a detachable device's battery (e.g., given limited output power capability, the processor 204 may decide to provide power to fewer than all detachable devices 126 if a battery is critically low);
- identification of the detachable devices 126 (e.g., provision of power may be prioritized based on manufacturer).

Given selection of a power supply output voltage, the processor 204 may cause the power delivery controllers 202 to transmit a message to the detachable devices 126 notifying the detachable devices 126 of one or more voltages (and associated current or power) available for use by the detachable devices 126. For example, the power delivery controller 202 may notify the detachable device 126 that the cooperatively selected voltage and a predetermined voltage (e.g., 5 volts) are available for use by the detachable device 126. The predetermined voltage will generally be a voltage useable by all detachable devices 126.

Responsive to notification of the available voltages, each detachable device 126 may request that one of the available voltages be provided to the detachable device 126. Each detachable device 126 will generally request the cooperatively selected voltage because the cooperatively selected voltage will be higher than, and consequently provide greater operational capability, than the predetermined voltage. Should the detachable devices 126 not all select the same advertised available voltage, then the processor 204 may reinitiate selection of available voltages and advertise only the predetermined voltage to the detachable devices 126. On selection of a same one of the available voltages by the detachable devices, the processor 204 may communicate with the power supply 104, via output signals 116, to cause the power supply 104 to generate the selected output voltage.

If the processor 204 evaluates the power utilization capabilities of all the detachable devices 126 and determines that the power supply 104 cannot simultaneously support all detachable devices 126, then the processor 204 may determine whether a subset of detachable devices 126 can be simultaneously supported. The processor 204 may consider various combinations of the detachable devices 126 until at least one detachable device 126 that can be supported is identified. Detachable devices 126 that cannot be supported may be isolated from the power supply 104 by opening the power switch 106 corresponding to the isolated detachable device 126. Each power delivery controller 102 associated with an isolated detachable device 126 may monitor for disconnection of the detachable device 126 and connection of a different detachable device 126. If none of the detachable devices 126 can be supported by the power supply 104, then the processor 204 may cause the power delivery controllers to advertise the availability of only 5 volts.

Figure 3:
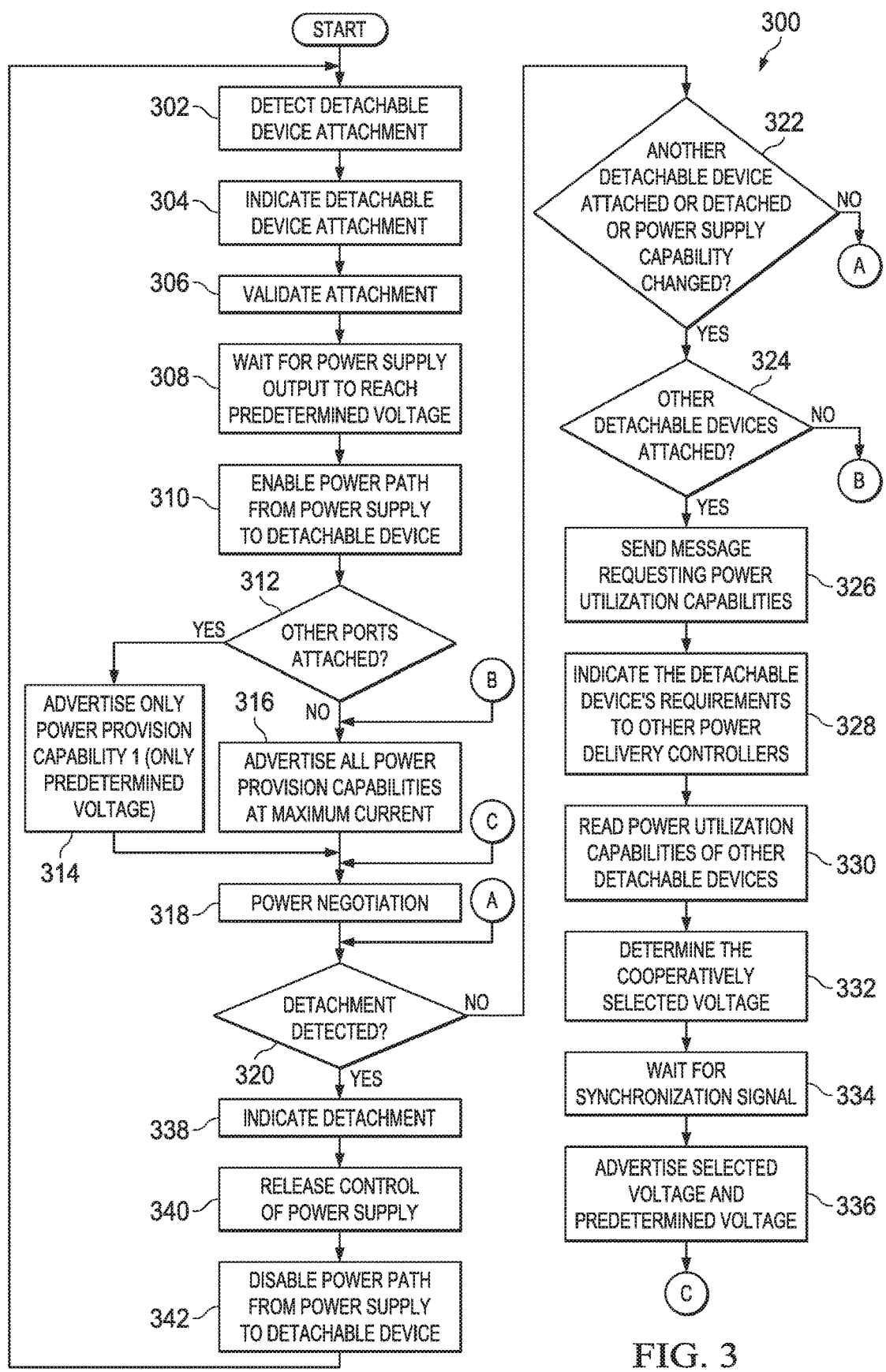
FIG. 3 shows a flow diagram for a method for managing power delivery from a single stage power supply to multiple devices in accordance with various embodiments.

FIG. 3 shows a flow diagram for a method 300 for managing power delivery from a single stage power supply to multiple devices in accordance with various embodiments. Though depicted sequentially as a matter of convenience, at least some of the actions shown can be performed in a different order and/or performed in parallel. Additionally, some embodiments may perform only some of the actions shown. Operations of the method 300 may be performed by embodiments of the power delivery systems 100 and/or 200. Operations of the method 300 described with respect to the power delivery controller 102 are also applicable to the power delivery controller 202 and processor 204.

In block 302, the power delivery controller 102 detects attachment of a detachable device 126 to the power delivery controller 102. For example, the detachable device 126 may be coupled to an electrical connector associated with the power delivery controller and the power delivery controller 102 may detect a signal 118 being pulled down by attachment of the detachable device 126.

In block 304, the power delivery controller 102 that detected attachment of the detachable device 126 communicates detection of the attachment to the other power delivery controllers 102 (or the processor 204).

In block 306, the power delivery controller 102 validates the attachment. For example, the power delivery controller 102 may monitor an indication of the attachment (a signal 118 being pulled down) for a time interval sufficient to verify that the attachment is not transient.

In block 308, the power supply 104 is generating a predetermined voltage (e.g., 5 volt) output. The power delivery controller 102 is monitoring the output 110 of the power supply 104, and waits for the output 110 to reach the predetermined voltage (e.g., 5 volts). For example, if a single detachable device 126 is connected to the system 100, then the single detachable device 126 may employ any voltage supported by the power supply 104, and such a voltage may be higher than a newly connected detachable device 126 can employ. Accordingly, on detection of attachment, the output voltage of the power supply 104 may be reduced to a predetermined voltage supported by all detachable devices 126 (e.g., 5 volts) before the newly detected detachable device is connected to the power supply 104 (i.e., before the power switch 106 is closed).

In block 310, the output 110 of the power supply 104 is at a predetermined voltage (e.g., 5 volts) and the power delivery controller 102 closes the switch 106 to route power from the power supply 104 to the detachable device 126. With closing of the switch 106, power is provided to the newly detected detachable device 126 at the predetermined voltage.

In block 312, the power delivery controller 102 determines whether a detachable device 126, in addition to the newly detected detachable device 126, is coupled to a different power delivery controller 102. If the newly detected detachable device 126 is the only detachable device 126 coupled to a power delivery controller 102, then in block 316, the power delivery controller 102 notifies the detachable device 126 of all of the power provision capabilities of the power supply 104. For example, the power delivery controller 102 may inform the detachable device 126 of all of the voltages (and associated currents or powers) that the power supply 104 can produce if only a single detachable device 126 is coupled to the system 100.

On the other hand, if, in block 312, an additional detachable device 126 is found to be coupled to a different power delivery controller 102, then, in block 314, the power delivery controller 102 notifies the detachable device 126 that only the predetermined voltage (e.g., 5 volts) is available from the power supply 104.

In block 318, the power delivery controller 102 and the detachable device 126 coupled to the power delivery controller 102 exchange messages to select a power supply voltage to be provided to the detachable device 126. The selected power supply voltage must be one of the voltages offered by the power delivery controller 102 in block 314 or 316. Additional information regarding the message exchange is provided in FIG. 5 and associated text.

In block 320, the power delivery controller 102 is monitoring connection of the detachable device 126 to the power delivery controller 102. If detachment of the detachable device 126 is not detected, then, in block 322, the power delivery controller 102 determines whether a different detachable device 126 has been attached to or detached from a different power delivery controller 102, or if the power provision capabilities of the power supply 104 have changed. If another detachable device has not been attached to or detached from a different power delivery controller 102 and the power provision capabilities of the power supply 104 have not changed, then the power delivery controller 102 continues to monitor connection of the detachable device in block 320.

On the other hand, if, in block 322, a detachable device 126 has been attached to or detached from a different power delivery controller 102, or the power provision capabilities of the power supply 104 have changed, then in block 324, the power delivery controller 102 determines whether multiple detachable devices 126 are connected. If multiple detachable devices 126 are not connected, then the method continues with advertisement of all power supply capabilities in block 316.

If, in block 324, multiple detachable devices 126 are connected, then, in block 326, the power delivery controller 102 sends a message to the detachable device 126 coupled to the power delivery controller 102 requesting that the detachable device 126 provide information regarding the power utilization capabilities of the detachable device 126.

In block 328, the power delivery controller 102 receives power utilization information from the detachable device 126 and provides the information to each other of the power delivery controllers 102 (or the processor 204).

In block 330, the power delivery controller 102 (or the processor 204) assesses the power utilization capabilities of all of the detachable devices 126 coupled to a power delivery controller 102.

In block 332, the power delivery controller 102 (or the processor 204) selects one of the voltages available from the power supply 104 to be advertised to the detachable devices 106 in addition to the predetermined voltage. The one of the voltages selected may be determined based on power utilization capability information provided by the detachable devices 126. For example, a highest voltage usable by all the detachable devices 126 may be selected.

In block 334, the power delivery controller 102 waits for assertion of a synchronization signal. The synchronization signal may indicate that all of the power delivery controllers 102 are ready to advertise selected capabilities of the power supply 104 to the detachable devices 126. In distributed architectures, the synchronization signal may be generated by the power delivery controllers 102. In centralized architectures the synchronization signal may be internally generated by the processor 204 with the processor 204 signaling to the power delivery controllers 102 thereafter.

In block 336, the power delivery controller 102 transmits a message to the detachable device 126. The message notifies the detachable device 126 that only the voltage selected in block 332 and a predetermined voltage (e.g., 5 volts) are available for use by the detachable device 126. In some embodiments, the predetermined voltage may be advertised as providing a reduced amount of current in order to encourage selection, by the detachable device 126, of the voltage chosen in block 332. Should a detachable device 126 select the predetermined voltage, then the device 126 may be isolated from the power supply 104, or only the predetermined voltage may be subsequently advertised. The method 300 continues in block 318 with an exchange messages to select a power supply voltage to be provided to the detachable device 126.

Returning now to block 320, if detachment of the detachable device 126 is detected, then, in block 338, the power delivery controller 102 notifies each of the other power delivery controllers 102 (or the processor 204) of the detected detachment.

In block 340, the power delivery controller 102 relinquishes control of the power supply 104.

In block 342, the power delivery controller 102 opens the power switch 106 to disconnect the power supply 104 from a connector to which a detachable device 126 may be connected. The method 300 continues in block 302 with the power delivery controller 102 monitoring for connection of a detachable device 126.

Figure 4:
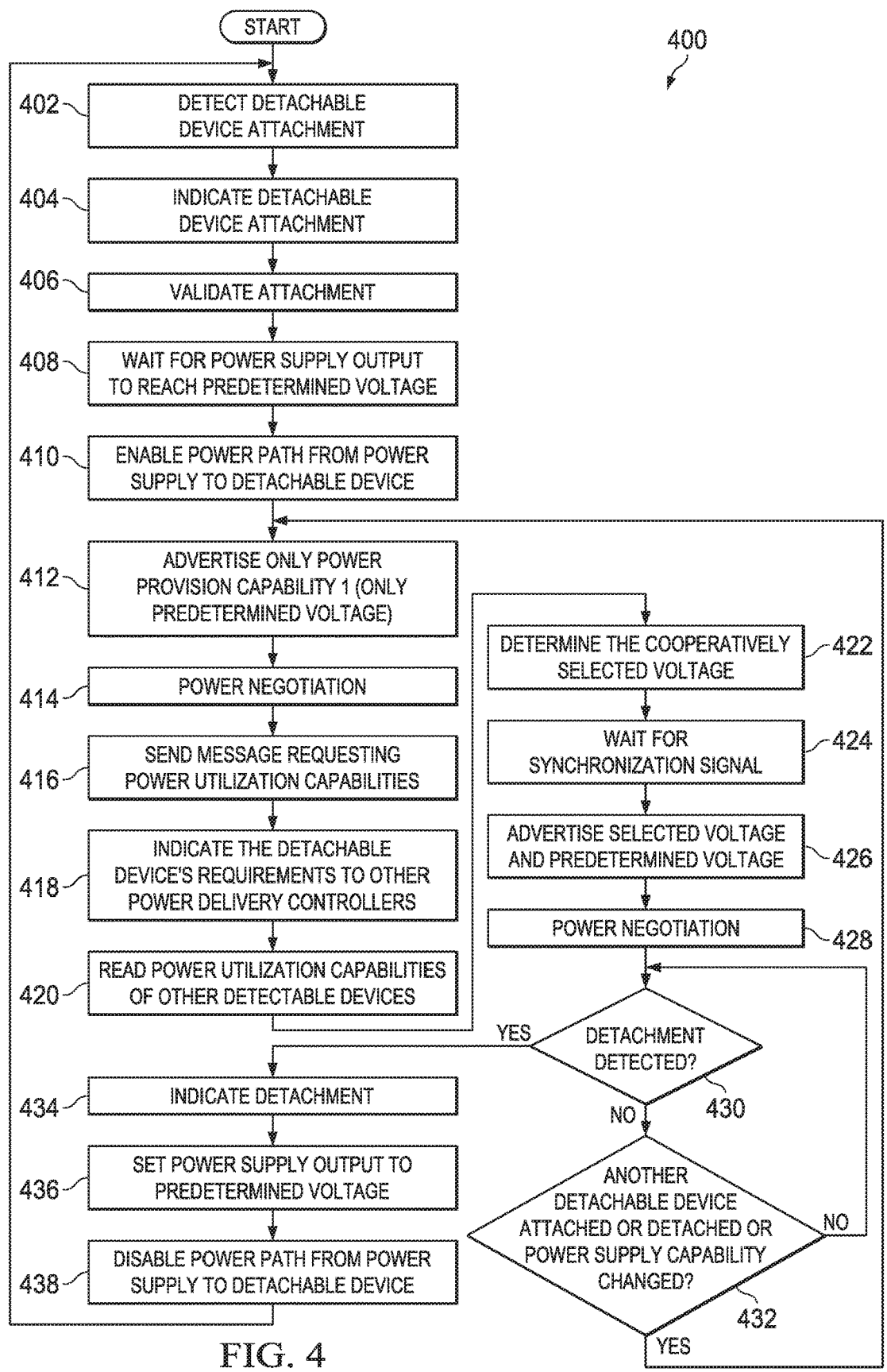
FIG. 4 shows a flow diagram for a method for managing power delivery from a single stage power supply to multiple devices in accordance with various embodiments.

FIG. 4 shows a flow diagram for a method 400 for managing power delivery from a single stage power supply to multiple devices in accordance with various embodiments. Though depicted sequentially as a matter of convenience, at least some of the actions shown can be performed in a different order and/or performed in parallel. Additionally, some embodiments may perform only some of the actions shown. Operations of the method 400 may be performed by embodiments of the power delivery systems 100 and/or 200. Operations of the method 400 described with respect to the power delivery controller 102 are also applicable to the power delivery controller 202 and processor 204.

In block 402, the power delivery controller 102 detects attachment of a detachable device 126 to the power delivery controller 102. For example, the power delivery controller 102 may detect a signal 118 being pulled down by attachment of the detachable device 126.

In block 404, the power delivery controller 102 that detected attachment of the detachable device 126 communicates detection of the attachment to the other power delivery controllers 102 (or the processor 204).

In block 406, the power delivery controller 102 validates the attachment. For example, the power delivery controller 102 may monitor an indication of the attachment (a signal 118 being pulled down) for a time interval sufficient to verify that the attachment is not transient.

In block 408, the power supply 104 is generating a predetermined voltage (e.g., 5 volt) output. The power delivery controller 102 is monitoring the output 110 of the power supply 104, and waits for the output 110 to reach the predetermined voltage (e.g., 5 volts). For example, if a single detachable device 126 is connected to the system 100, then the single detachable device 126 may employ any voltage supported by the power supply 104, and such a voltage may be higher than a newly connected detachable device 126 can employ. Accordingly, on detection of attachment, the output voltage of the power supply 104 may be reduced to a voltage supported by all detachable devices 126 (e.g., 5 volts) before the newly detected detachable device is connected to the power supply 104 (i.e., before the power switch 106 is closed).

In block 410, the output 110 of the power supply 104 is at the predetermined voltage (e.g., 5 volts) and the power delivery controller 102 closes the switch 106 to route power from the power supply 104 to the detachable device 126. With closing of the switch 106, power is provided to the newly detected detachable device 126 at the predetermined voltage.

In block 412, the power delivery controller 102 notifies the detachable device 126 that only the predetermined voltage (e.g., 5 volts) is available from the power supply 104.

In block 414, the power delivery controller 102 and the detachable device 126 coupled to the power delivery controller 102 exchange messages to select a power supply voltage to be provided to the detachable device 126. Additional information regarding the message exchange is provided in FIG. 5 and associated text.

In block 416, the power delivery controller 102 sends a message to the detachable device 126 coupled to the power delivery controller 102 requesting that the detachable device 126 provide information regarding the power utilization capabilities of the detachable device 126.

In block 418, the power delivery controller 102 receives power utilization information from the detachable device 126 and provides the information to each other of the power delivery controllers 102 (or the processor 204).

In block 420, the power delivery controller 102 (or the processor 204) assesses the power utilization capabilities of all of the detachable devices 126 coupled to a power delivery controller 102.

In block 422, the power delivery controller 102 (or the processor 204) selects one of the voltages available from the power supply 104 to be advertised to the detachable devices 106. The one of the voltages selected may be determined based on power utilization capability information provided by the detachable devices 126. For example, a highest voltage usable by all the detachable devices 126 may be selected.

In block 424, the power delivery controller 102 waits for assertion of a synchronization signal. The synchronization signal may indicate that all of the power delivery controllers 102 are ready to advertise selected capabilities of the power supply 104 to the detachable devices 126. In distributed architectures, the synchronization signal may be generated by the power delivery controllers 102. For example, each power delivery controller 102 may generate a ready signal, and the synchronization signal may be asserted responsive to assertion of ready signals from all the power delivery controllers 102. In centralized architectures, the synchronization signal may be internally generated by the processor 204 responsive to selection of the voltage in block 422, with the processor 204 signaling the power delivery controllers 102 thereafter.

In block 426, the power delivery controller 102 transmits a message to the detachable device 126. The message notifies the detachable device 126 that only the voltage selected in block 422 and a predetermined voltage (e.g., 5 volts) are available for use by the detachable device 126.

In block 428, the power delivery controller 102 and the detachable device 126 coupled to the power delivery controller 102 exchange messages to select a power supply voltage to be provided to the detachable device 126. Additional information regarding the message exchange is provided in FIG. 5 and associated text.

In block 430, the power delivery controller 102 is monitoring connection of the detachable device 126 to the power delivery controller 102. If detachment of the detachable device 126 is not detected, then, in block 432, the power delivery controller 102 determines whether a detachable device 126 has been attached to or detached from a different power delivery controller 102, or if the power provision capabilities of the power supply 104 have changed. If another detachable device has not been attached to or detached from a different power delivery controller 102 and the power provision capabilities of the power supply 104 have not changed, then the power delivery controller 102 continues to monitor connection of the detachable device in block 430.

On the other hand, if, in block 432, a detachable device 126 has been attached to or detached from a different power delivery controller 102, or the power provision capabilities of the power supply 104 have changed, then the method 400 continues in block 412 with notification to the detachable device 126 of the availability of only the predetermined voltage (e.g., 5 volts) from the power supply 104.

Returning now to block 430, if detachment of the detachable device 126 is detected, then, in block 434, the power delivery controller 102 notifies each of the other power delivery controllers 102 (or the processor 204) of the detected detachment.

In block 436, the power delivery controller 102 sets the power supply 104 to provide the predetermined voltage (e.g., 5 volts) on the output 110 which is equivalent to relinquishing control of the power supply 104 so that other port controllers may control the power supply 104.

In block 438, the power delivery controller 102 opens the power switch 106 to disconnect the power supply 104 from a connector to which a detachable device 126 may be connected. The method 400 continues in block 402 with the power delivery controller 102 monitoring for connection of a detachable device 126.

Figure 5:
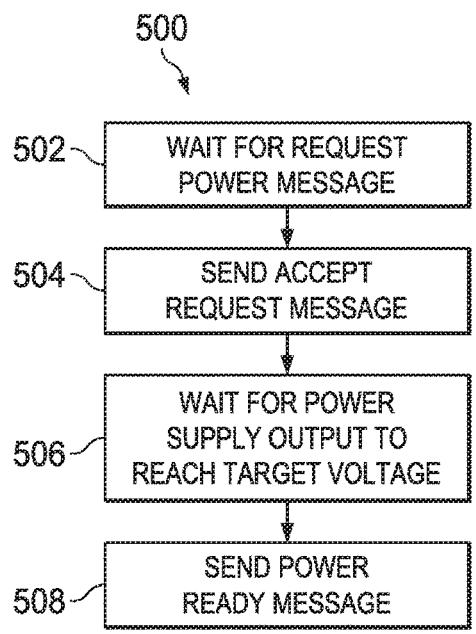
FIG. 5 shows a flow diagram for a method for negotiating power to be provided to a device in a power provision system in accordance with various embodiments.

FIG. 5 shows a flow diagram for a method 500 for negotiating power to be provided to a device in a power provision system in accordance with various embodiments. Though depicted sequentially as a matter of convenience, at least some of the actions shown can be performed in a different order and/or performed in parallel. Additionally, some embodiments may perform only some of the actions shown. Operations of the method 500 may be performed by embodiments of the power delivery systems 100 and/or 200. Operations of the method 500 may be performed as part of the message exchange of blocks 318, 414, and 428.

In block 502, the power delivery controller 102 has notified the detachable device 126 of the power provision capabilities of the power supply 104 (e.g., the voltages available to power the detachable device 126). The power delivery controller 102 waits for a response from the detachable device 126. The response includes a request that one of the available voltages be provided to power the detachable device 126.

In block 504, the power delivery controller 102 evaluates the request received from the detachable device 126, determines whether the request can be granted, and transmits a message accepting the request to the detachable device 126. On acceptance of the request, the power delivery controller 102 (or the processor 204) sets the power supply 104 to generate the request voltage.

In block 506, the power delivery controller 102 is monitoring the output 110 of the power supply 104, and waits for the output 110 to reach the requested voltage.

In block 508, the power delivery controller 102 transmits a message to the detachable device 126 indicating that the output 110 of the power supply 104 has settled at the requested voltage.

Figure 6:
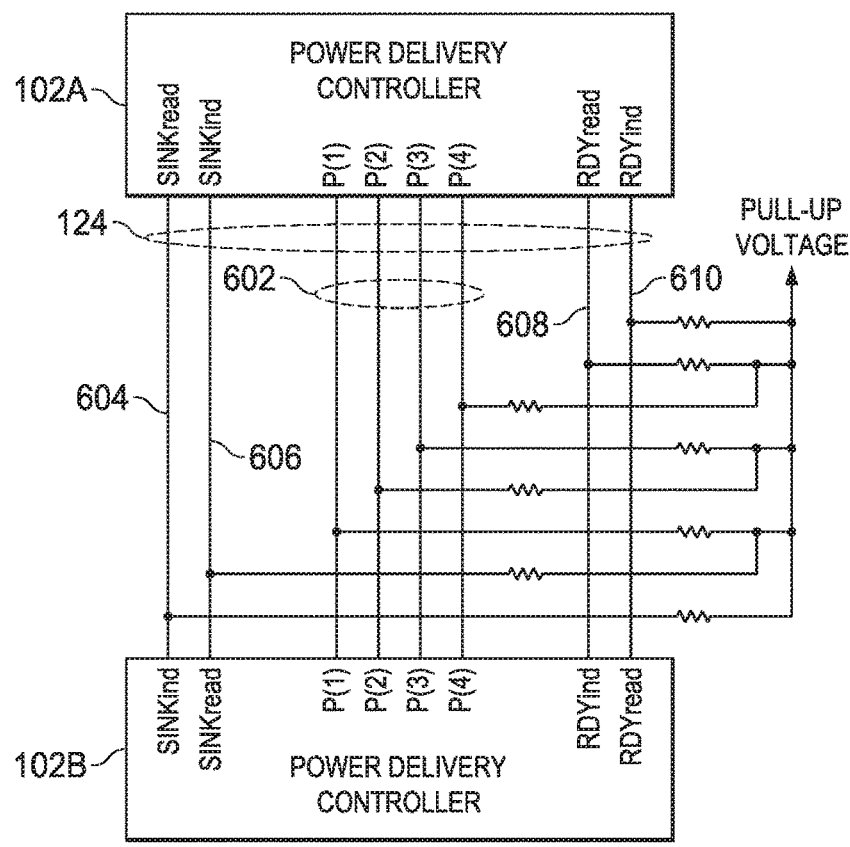
FIG. 6 shows power delivery controllers configured for decentralized operation in a power provision system in accordance with various embodiments.

FIG. 6 shows power delivery controllers 102A and 102B configured for decentralized (i.e., distributed) operation in a power provision system in accordance with various embodiments. The power delivery controllers 102A and 102B are communicatively coupled via the communication signals 602. The signals 602 communicate the acceptability of particular power provision capabilities of the power supply 104 to the detachable devices 126 coupled to the power delivery controllers 102. Each signal 602 is representative of a different power provision capability (e.g., a different voltage/current combination). If the power provision capability corresponding to a given signal 602 is not acceptable to the detachable device 126 coupled to the power delivery controller 102, then the power delivery controller 102 may negate (e.g., pull down) the given signal 602. Thus, each signal 602 indicates whether any detachable device 126 finds the corresponding power provision capability unacceptable.

The signal 604 indicates whether a detachable device 126 is coupled to the power delivery controller 102B. If the signal 604 is asserted (e.g., pulled low), then the power delivery controller 102A is notified that a detachable device 126 is connected to the power delivery controller 102B. Similarly, if the signal 606 is asserted (e.g., pulled low), then the power delivery controller 102B is notified that a detachable device 126 is connected to the power delivery controller 102A. Assertion of the signal 604 or 606 indicates that the power delivery controllers 102 are to transition the power supply 104 to predetermined voltage (e.g., 5 volt) output.

After the power delivery controller 102B has determined the power requirements of the detachable device 126 coupled thereto, and has updated all of the signals 602, the power delivery controller 102B asserts the signal 608. Similarly, after the power delivery controller 102A has determined the power requirements of the detachable device 126 coupled thereto, and has updated all of the signals 602, the power delivery controller 102A asserts the signal 610. When both signal 608 and 610 are asserted (i.e., a synchronization signal is asserted to generally align the timing of the power delivery controllers 102), the power delivery controllers 102 read the state of the signals 602. The asserted signal 602 corresponding to the highest voltage may be the cooperatively selected voltage; other selection criteria may also be applied. Both power delivery controllers 102 will always calculate the same voltage, and signal the power supply 104 to produce the voltage.

Because advertising of the available voltages is synchronized by assertion of the signals 608 and 610, the power delivery controllers 102 will generally be ready for the power supply voltage to rise at approximately the same time. If for any reason one of the power delivery controllers 102 has an error it may pulse signal 604 or 606 to cause the other power delivery controllers 102 to return to the predetermined voltage (e.g., 5 volts) as quickly as possible.

In some embodiments, the power delivery controllers 102 may communicate using a single or two wire serial interface, where each power delivery controller 102 has an assigned slot for communicating whether a detachable device 126 is connected, and communicating the acceptability to the connected detachable device 126 of each power provision capability of the power supply 104.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power provider circuit, comprising:
    a plurality of power delivery controllers, each of the power delivery controllers configured to provide power to a detachable device;
    a single stage power supply configured to:
        generate the power for provision to the detachable devices; and
        provide the power at a plurality of selectable voltages; and
    control circuitry configured to select a given voltage of the plurality of selectable voltages to be made available via all of the power delivery controllers based on power utilization capabilities reported by the detachable devices.

2. The power provider circuit of claim 1, wherein each of the power delivery controllers is configured to, responsive to selection of the given voltage, notify the detachable device coupled to the power delivery controller that only the given voltage and a predetermined voltage are available from the power delivery controller.

3. The power provider circuit of claim 1, wherein the control circuitry comprises a processor coupled to the power delivery controllers, the processor configured to:
    execute a comparison of the power utilization capabilities of each detachable device coupled to one of the power delivery controllers to power provision capabilities of the single stage power supply at each of the selectable voltages; and
    select the given voltage to be made available via all of the power delivery controllers based on a result of the comparison.

4. The power provider circuit of claim 1, wherein the control circuitry is configured to select the given voltage as a highest voltage of the plurality of selectable voltages that is compatible with power utilization capabilities of the detachable devices coupled to one of the power delivery controllers.

5. The power provider circuit of claim 1, wherein each of the power delivery controllers is configured to query the detachable device coupled to the power delivery controller to determine the power utilization capabilities of the detachable device.

6. The power provider circuit of claim 1, wherein:
    each of the power delivery controllers is coupled to the single stage power supply; and
    each of the power delivery controllers is configured to control the single stage power supply to select a voltage to be output by the single stage power supply from the plurality of selectable voltages.

7. The power provider circuit of claim 1, wherein each of power delivery controllers is configured to notify the detachable device coupled to the power delivery controller of availability of the given voltage responsive to notification of the acceptability of the given voltage to all the detachable devices coupled to any of the power delivery controllers.

8. The power provider circuit of claim 1, wherein each of the power delivery controllers is configured to notify the control circuitry of the power utilization capabilities of the detachable device coupled to the power delivery controller.

9. The power provider circuit of claim 1, wherein each of the power delivery controllers is configured to:
    detect attachment of a detachable device to the power delivery controller;
    notify the control circuitry of detected attachment of a detachable device; and
    responsive to notification of detected attachment of a detachable device from a different one of the power delivery controllers, notify the detachable device coupled to the power delivery controller that only a predetermined voltage is available from the power delivery controller.

10. A method for power delivery, comprising:
    retrieving, by a first power delivery controller, from a first detachable device, power utilization capabilities of the first detachable device;
    retrieving, by a second power delivery controller, from a second detachable device, power utilization capabilities of the second detachable device; and
    selecting one of a plurality of voltages to generate as an output voltage of a single stage power supply to be made available to the first detachable device and the second detachable device based on the power utilization capabilities of the first detachable device and the power utilization capabilities of the second detachable device.

11. The method of claim 10, further comprising, responsive to selection of the output voltage, notifying the first detachable device and the second detachable device that only the output voltage and a predetermined voltage are available from the first power delivery controller and the second power delivery controller.

12. The method of claim 10, further comprising:
comparing the power utilization capabilities of the first detachable device and the power utilization capabilities of the second detachable device to power provision capabilities of the single stage power supply at each of the selectable voltages; and
selecting the output voltage to be made available based on a result of the comparing.

13. The method of claim 10, further comprising selecting the output voltage as a highest voltage of the plurality of selectable voltages that is compatible with power utilization capabilities of the detachable devices.

14. The method of claim 10, further comprising:
querying the first detachable device by the first power delivery controller to determine the power utilization capabilities of the first detachable device; and
querying the second detachable device by the second power delivery controller to determine the power utilization capabilities of the second detachable device.

15. The method of claim 10, further comprising controlling the single stage power supply by each of the first power delivery controller and the second power delivery controller to cause the single stage power supply to produce the output voltage.

16. The method of claim 10, further comprising:
notifying, by the second power delivery controller, the first power delivery controller of the acceptability of the output voltage to the second detachable device; and
notifying, by the first power delivery controller, the first detachable device of availability of the output voltage responsive to the notifying by the second power controller.

17. The method of claim 10, further comprising notifying, by the first power delivery controller and the second power delivery controller, control circuitry that selects the output voltage of the power utilization capabilities of the first detachable device and the second detachable device.

18. A power provision system, comprising:
a plurality of power delivery controllers, each of the power delivery controllers configured to provide power to a detachable device;
a single stage power supply configured to:
generate the power for provision to the detachable devices; and
provide the power at a plurality of selectable voltages; and
control circuitry configured to:
determine whether multiple detachable devices are connected to the power delivery controllers;
responsive to a determination that a single detachable device is connected to the power delivery controllers, cause a given one of the power delivery controllers to notify the single detachable device of availability of all of the selectable voltages; and
responsive to a determination that multiple detachable devices are connected to the power delivery controllers, cause the power delivery controllers to notify the multiple detachable devices of availability of no more than two of the selectable voltages.

19. The power provision system of claim 18, wherein:
each of the power delivery controllers is further configured to query the detachable device coupled to the power delivery controller to determine the power utilization capabilities of the detachable device; and
the control circuitry is further configured to:
select a given voltage of the plurality of selectable voltages to be made available via all of the power delivery controllers based on power utilization capabilities of the detachable devices determined by the power delivery controllers; and
responsive to a determination that multiple detachable devices are connected to the power delivery controllers, cause each of the power delivery controllers to notify the detachable device coupled to the power delivery controller that only the given voltage and a predetermined voltage are available from the power delivery controller.

20. The power provision system of claim 18, wherein the control circuitry is further configured to, responsive to a determination that multiple detachable devices are connected to the power delivery controllers, cause each of the power delivery controllers to notify the multiple detachable devices of availability of only a single predetermined one of the selectable voltages.

* * * * *